(12) United States Patent
Nakano et al.

(10) Patent No.: US 6,324,349 B2
(45) Date of Patent: *Nov. 27, 2001

(54) CAMERA HAVING A SHEATH WHICH IS INCORPORATED INTO THE CAMERA BODY WITHOUT BEING DISTORTED

(75) Inventors: Toshifumi Nakano, Sagamihari; Shinya Takahashi, Hino; Tatsuya Suzuki, Tokyo, all of (JP)

(73) Assignee: Olympus Optical Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/360,259

(22) Filed: Jul. 26, 1999

(30) Foreign Application Priority Data

Aug. 4, 1998  (JP) .................................................. 10-220517

(51) Int. Cl.$^7$ ..................................................... G03B 17/02
(52) U.S. Cl. .............................................. 396/535; 396/541
(58) Field of Search ................................. 396/6, 25, 27, 396/29, 287, 439, 440, 535, 541

(56) References Cited

U.S. PATENT DOCUMENTS

| | | | |
|---|---|---|---|
| 2,855,826 | * 10/1958 | Jayet | 396/27 |
| 3,860,937 | * 1/1975 | Wolfe | 396/27 |
| 5,361,109 | * 11/1994 | Kamoda et al. | 396/176 |
| 5,436,685 | * 7/1995 | Yamashina | 396/439 |
| 5,732,302 | * 3/1998 | Yokota | 396/535 |
| 5,815,758 | * 9/1998 | Terada | 396/535 |
| 5,832,312 | * 11/1998 | Rieger et al. | 396/25 |
| 5,999,750 | * 12/1999 | Yamada et al. | 396/176 |

FOREIGN PATENT DOCUMENTS 7-20549   1/1995   (JP) .

* cited by examiner

*Primary Examiner*—David M. Gray
(74) *Attorney, Agent, or Firm*—Frishauf, Holtz, Goodman, Langer & Chick, PC

(57) ABSTRACT

A camera comprising a camera sheath composed of a front cover unit and a rear cover unit, a camera body supported in the camera sheath, and positioning mechanism for positioning the camera body with respect to the camera sheath without fixing them. The positioning mechanism is composed of a pair of protrusions protruding from the front cover unit and a pair of hole portions formed in a reinforcing plate unit of the camera body and capable of being fitted individually on the protrusions. A gap of about 1 mm or less is formed in the whole area between the camera body and the camera sheath except fitting portions including the positioning mechanism.

7 Claims, 6 Drawing Sheets

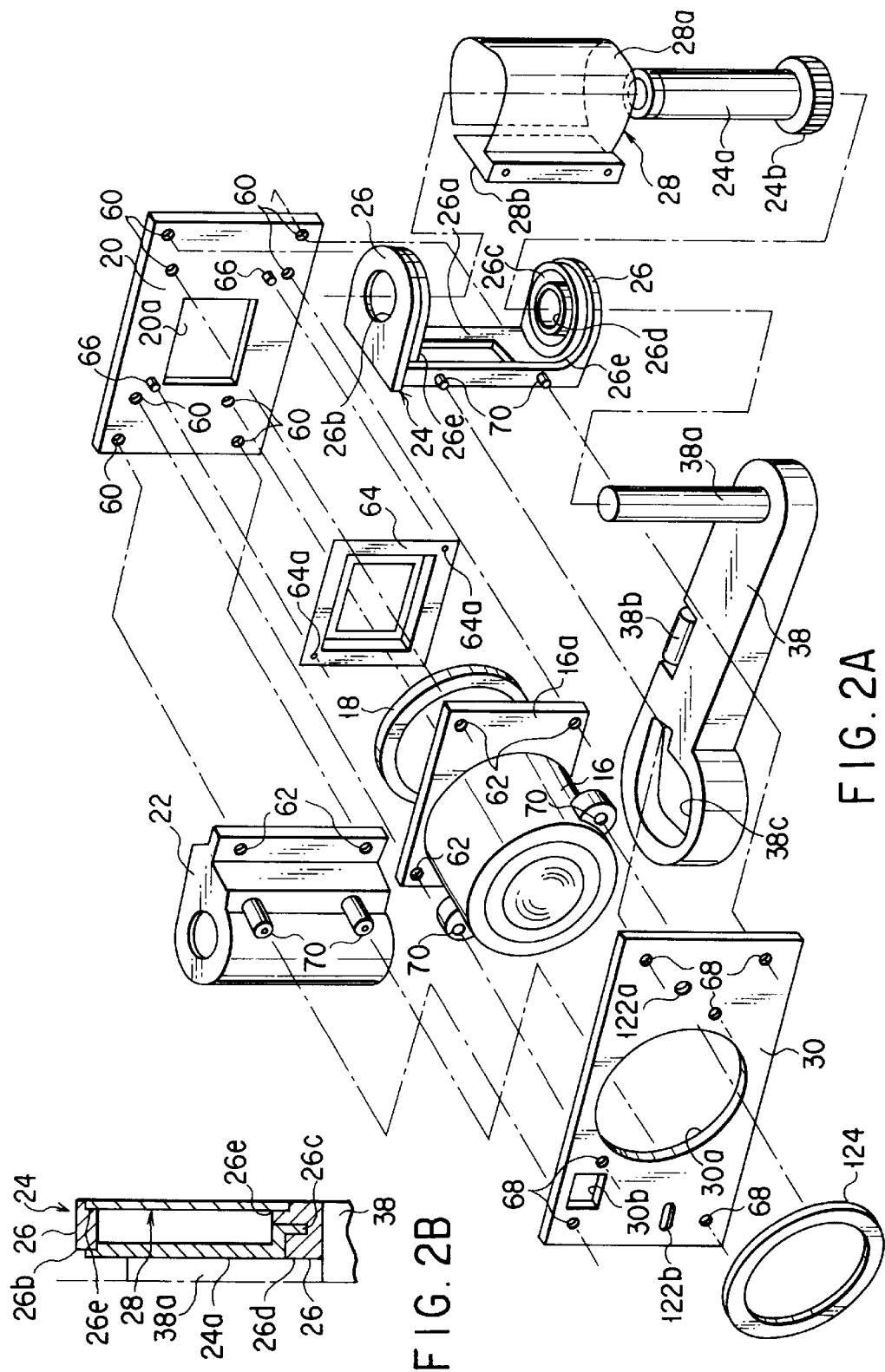

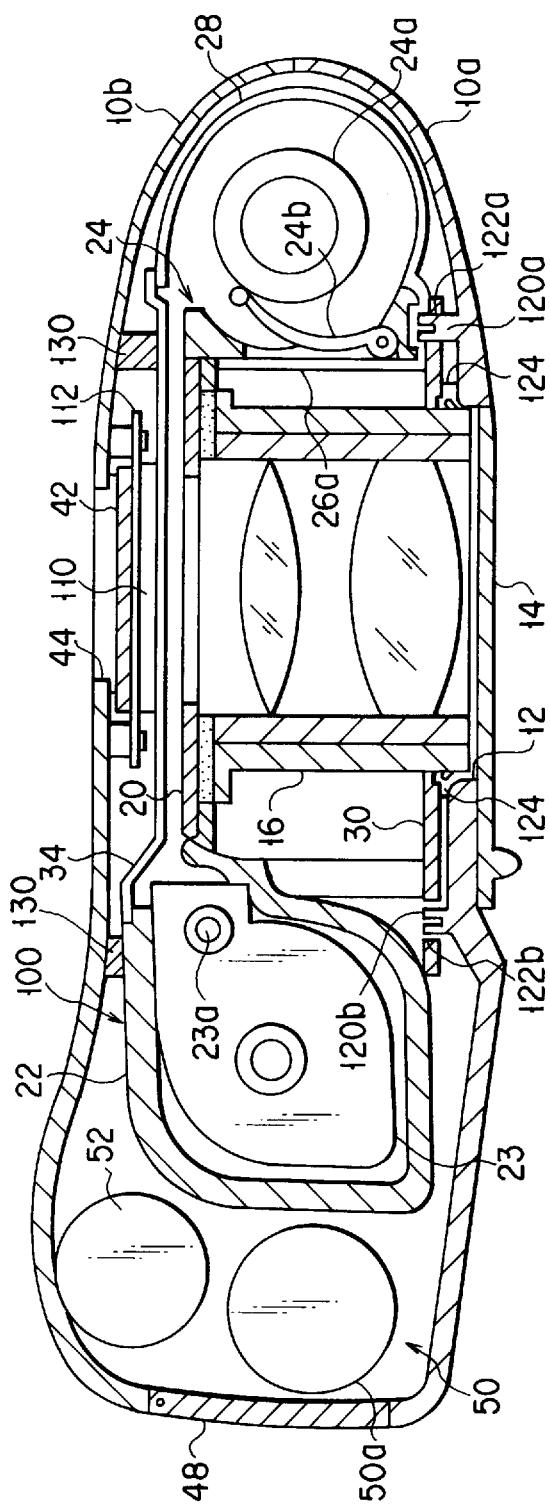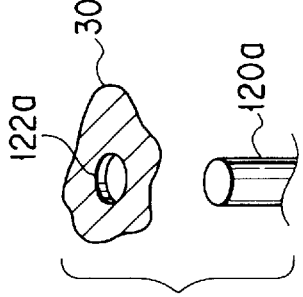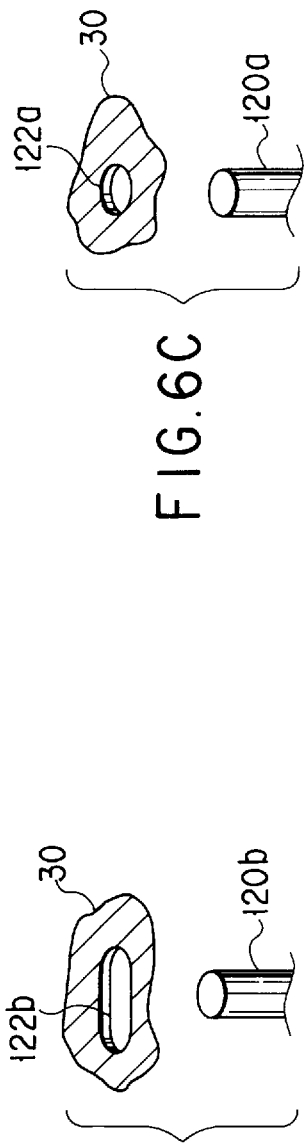

CAMERA HAVING A SHEATH WHICH IS INCORPORATED INTO THE CAMERA BODY WITHOUT BEING DISTORTED

BACKGROUND OF THE INVENTION

The present invention relates to a camera of which the body can be incorporated in a camera sheath (front and rear covers) without being distorted.

In a conventional camera, as is described in Jpn. Pat. Appln. KOKAI Publication No. 7-20549, for example, a camera body, which is composed integrally of a lens barrel, film feeding mechanism, etc., is held between a front cover and a rear cover after it is positioned with respect to the front cover. In this case, the camera body is brought intimately into contact with the front and rear covers as it is fixedly set between the covers.

The front and rear covers are not formed having high-accuracy shapes and dimensions and are subject to some malformation or dimensional errors. Thus, the covers are partially distorted in some measure.

If the distorted front and rear covers are fastened to each other, corrective force for distorted portions, distortional force that is generated in other portions by the correction of the distortion, etc. act directly on the camera body that is fixed close to the front and rear covers, thereby causing the camera body to be distorted. If the camera body is thus distorted, the optic axis, the gap between the lens barrel and the film surface, etc. are dislocated inevitably. In this case, electrical or mechanical adjustment should be made after the camera is assembled, for example, so that the camera production efficiency is lowered.

BRIEF SUMMARY OF THE INVENTION

The present invention has been contrived in consideration of these circumferences, and its object is to provide a high-productivity camera of which the body can be incorporated in a camera sheath without being distorted.

In order to achieve the above object, a camera according to the present invention is designed so that a camera sheath and a camera body are positioned without being fixed to each other.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2A is an exploded perspective view showing a configuration of a spool compartment;

FIG. 2B is a sectional view showing a configuration of a spool unit;

FIG. 6A is a sectional view showing a state in which the body of a camera according to a second embodiment of the invention is stored inside the front and rear cover units; and FIGS. 6B and 6C are views individually showing specific configurations of positioning means according to the second embodiment.

DETAILED DESCRIPTION OF THE INVENTION

A camera according to a first embodiment of the present invention will now be described with reference to the accompanying drawings.

Figure 1:
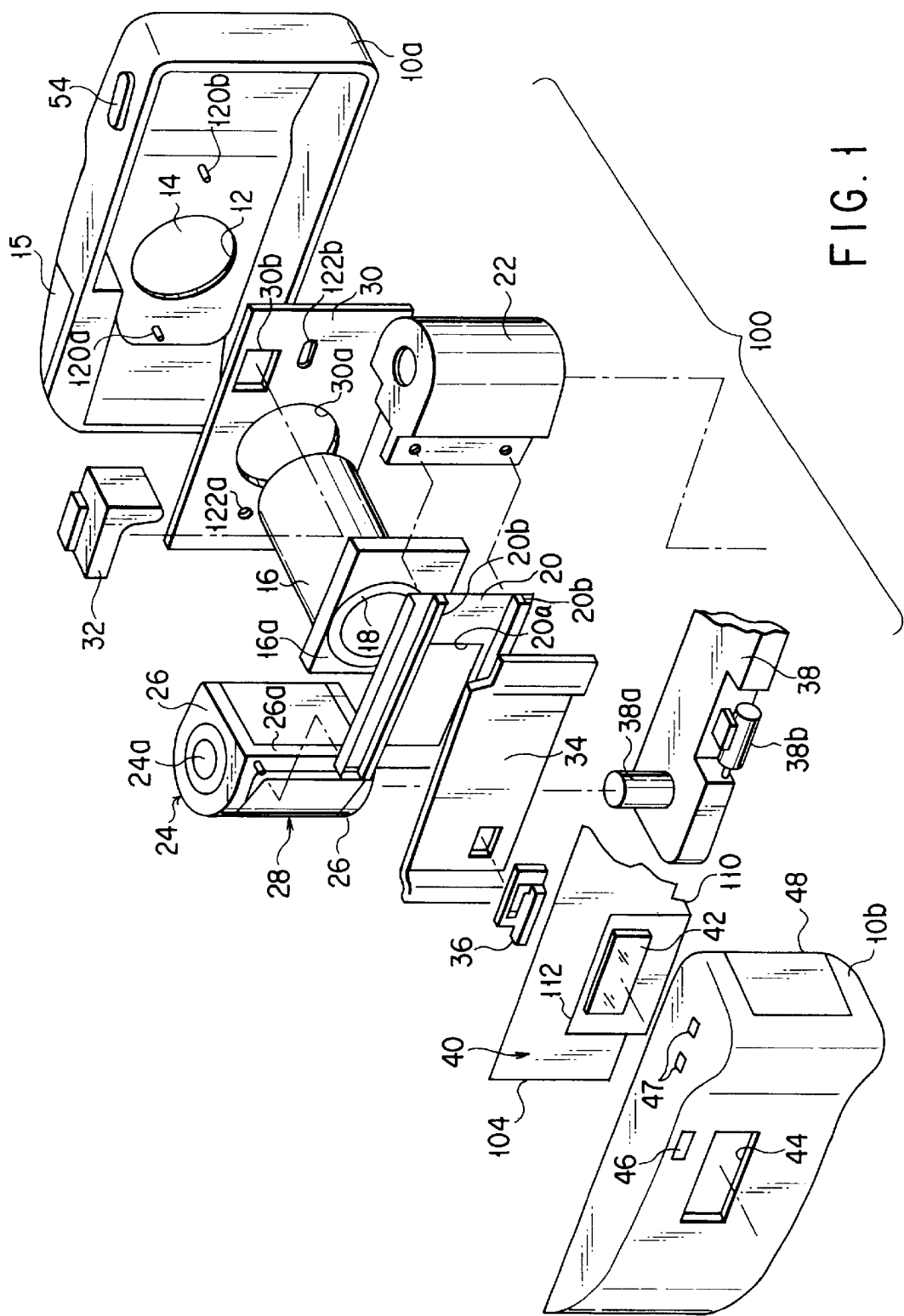
FIG. 1 is an exploded perspective view showing a configuration of a camera according to a first embodiment of the present invention.

As shown in FIGS. 1, 2A and 2B, the camera is provided with a camera sheath, which is composed of a front cover unit 10a and a rear cover unit 10b, and is designed so that a camera body 100 can be incorporated in the camera sheath (front and rear cover units 10a and 10b) without generating any stress that causes the body 100 to be distorted, with use of positioning means (mentioned later).

A lens barrel pop-out opening 12 is formed substantially in the center of the front face of the front cover unit 10a. The cover unit 10a is provided with a barrier member 14 that is movable between a closed position in which it closes the opening 12 and an exposure position in which the opening 12 is exposed. Further, a flashlight unit 15 is provided on the upper end portion of the front cover unit 10a.

The camera body 100, which is composed integrally of the following components, is stored in a storage space that is surrounded by the front and rear cover units 10a and 10b. The body 100 is kept floating by means of the positioning means (mentioned later).

In this camera body 100, a lens barrel unit 16 is located opposite to the lens barrel pop-out opening 12 of the front cover unit 10a. A lens barrel support substrate 16a at the proximal end portion of the unit 16 is fixed to the front face of a rail plate unit 20 by means of an elastic ring-shaped light shielding member 18.

The rail plate unit 20 is formed having an area restricting window 20a that is opposed to the lens barrel unit 16. An area restricting window frame or mask plate unit, which is located in the window 20a, is fixed to the front face of the rail plate unit 20. The mask plate unit, which is a thin sheet, is not shown in FIGS. 1, 2A and 2B.

A film cartridge unit 22 and a spool unit 24 are fixed to the opposite sides of the rail plate unit 20, individually. The units 22 and 24 constitute a film cartridge compartment and a spool compartment, respectively.

A pair of film rails 20b are formed on the rear face of the rail plate unit 20. The rails 20b extend parallel to each other from the film cartridge unit 22 to the spool unit 24, individually overlying and underlying the area restricting window 20a.

A film cartridge gate opening is formed in the undersurface of the film cartridge unit 22. Opposed to the film cartridge gate opening, a film cartridge gate lid (not shown) is provided for open-close motion on the undersurface of the rear cover unit 10b.

Although the camera according to the present embodiment is supposed to be a so-called new film cartridge (IX240 cartridge), it may alternatively be designed for use with an ordinary 35-mm film.

Figure 4A:
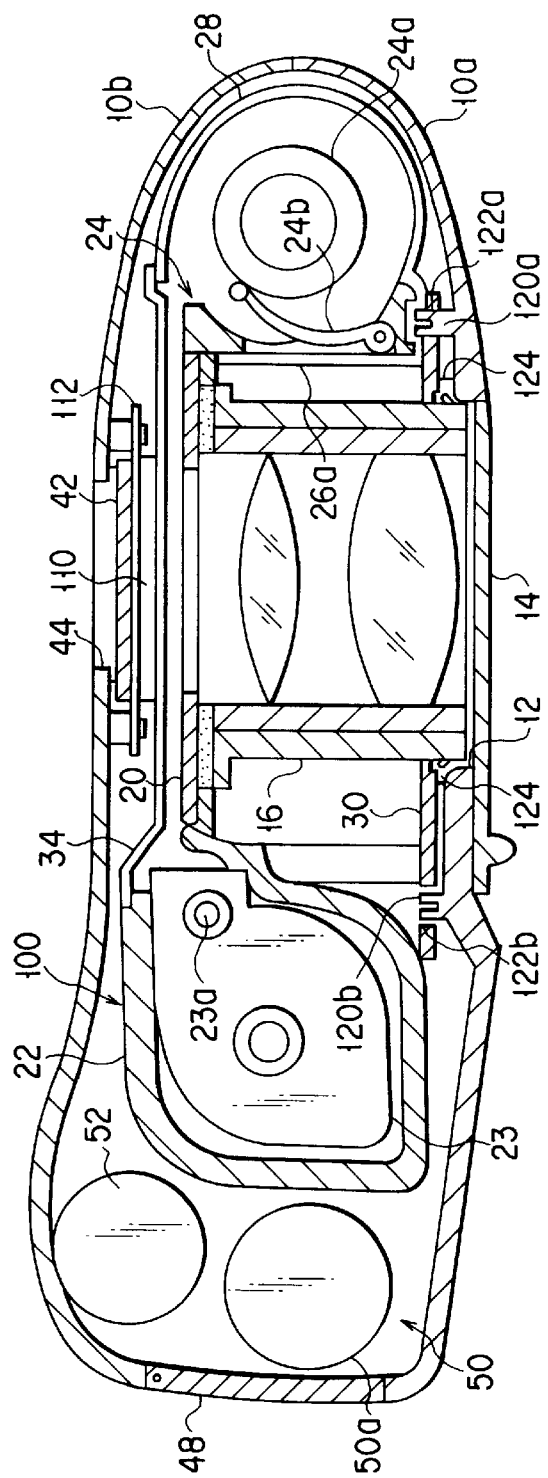
FIG. 4A is a sectional view showing a state in which the camera body is stored inside the front and rear cover units.
Figure 4C:
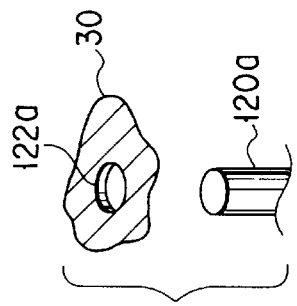
FIGS. 4B and 4C are views individually showing specific configurations of positioning means.
Figure 4B:
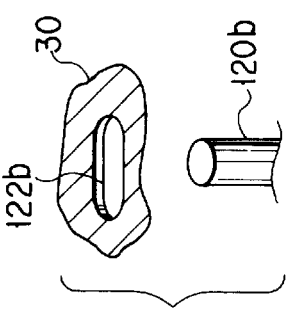

FIG. 4A shows a state in which a new film cartridge 23 is stored in the film cartridge compartment of the film cartridge unit 22.

The spool compartment of the spool unit 24 stores a hollow spool shaft 24a for rotation, and is provided with a film backup plate 24b that is rockable in the radial direction of the spool shaft 24a. The backup plate 24b is urged toward the outer peripheral surface of the spool shaft 24a by urging means (not shown). The plate 24a is used in automatically winding a film on the spool shaft 24a.

The spool compartment is composed of a pair of end walls 26 on either side in the film width direction, a portion 26a opposite to the lens barrel unit 16 and connected to the end walls 26, and a thin sheet 28 opposite to the portion 26a and capable of elastic deformation. A specific configuration of the spool compartment will be described later (see FIGS. 2A and 2B).

As shown in FIGS. 1, 2A and 2B, a reinforcing plate unit 30 is fixed between the film cartridge unit 22 and the spool unit 24 on the side nearer to the front cover unit 10a of the camera body 100. The plate unit 30 is formed having a lens barrel opening 30a opposed to the lens barrel unit 16 and a viewfinder opening 30b. The viewfinder opening 30b is located opposite to a range finder window 102 (see FIG. 3A) in the front cover unit 10a. An autofocus and viewfinder control unit (hereinafter referred to as AF unit) 32 is fixed to the viewfinder opening 30b.

Further, a pressure plate unit 34 is fixed between the film cartridge unit 22 and the spool unit 24 on the side nearer to the rear cover unit 10b of the camera body 100. The pressure plate unit 34 presses the film, forced out of the new film cartridge 23 in the film cartridge unit 22 and fed into the spool compartment of the spool unit 24, against the film rails 20b of the rail plate unit 20, thereby defining a film reference plane with respect to the lens barrel unit 16.

Since the new film cartridge 23 is used according to the present embodiment, the pressure plate unit 34 is provided with a magnetic head 36 for recording magnetic data on the magnetic recording track of the new film.

The film cartridge unit 22 and the spool unit 24 are coupled to a motor drive unit 38. The motor drive unit 38 comprises a motor 38a that is inserted in a center hole of the spool shaft 24a of the spool unit 24, turning force transmitting means including, for example, a gear train for transmitting turning force from the motor 38a alternatively to a plurality of specific spots, and a plunger-solenoid assembly 38b for changing the destination (specific spot) of transmission of the turning force by the turning force transmitting means.

The turning force transmitting means is coupled to the spool shaft 24a of the spool unit 24, a rotating shaft 23a (see FIG. 4A) of a film outlet gate door of the new film cartridge 23 in the film cartridge unit 22, and a film cartridge shaft 23b. The transmitting means alternatively opens or closes the film outlet gate door, forces out the new film from the new film cartridge 23, causes the cartridge 23 to take up the new film, or winds up new film form the cartridge 23 onto the spool shaft 24a.

Further, the pressure plate unit 34 is provided with a flexible substrate unit 40, which comprises an electric control circuit for electrically controlling the aforementioned various electrical parts. The substrate unit 40 is provided with a main substrate 104, which is located on the surface of the pressure plate unit 34 so as to face the rear cover unit 10b, and flexible printed boards (see FIG. 3B) extending from the substrate 104.

Figure 3A:
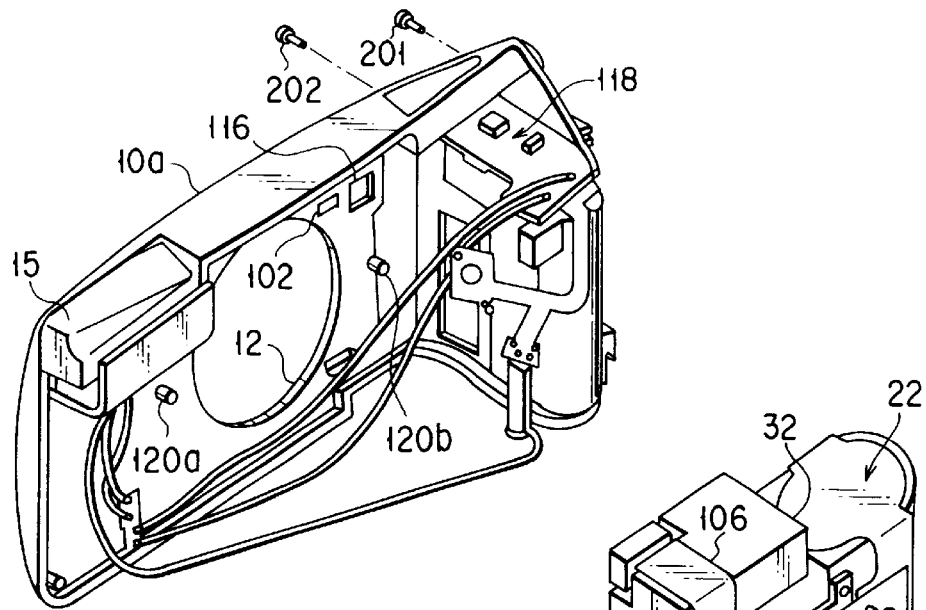
FIG. 3A is a perspective view showing a configuration of a front cover unit.
Figure 3B:
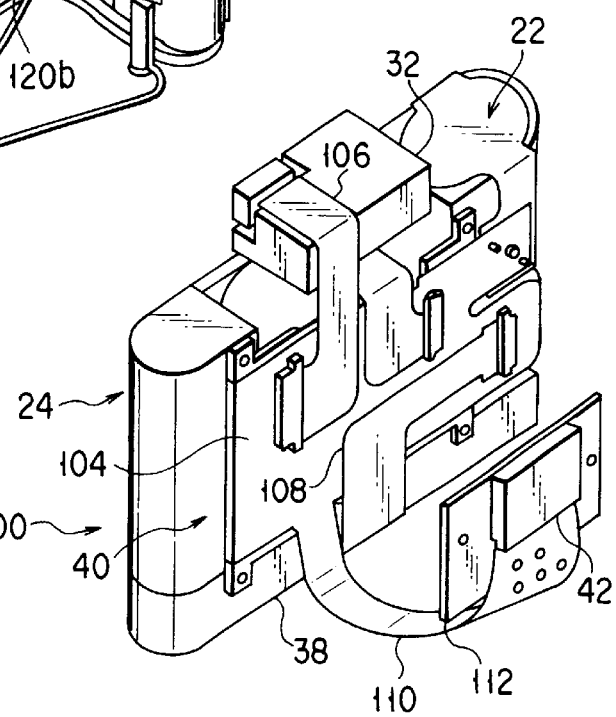
FIG. 3B is a perspective view showing a configuration of a camera body.
Figure 3C:
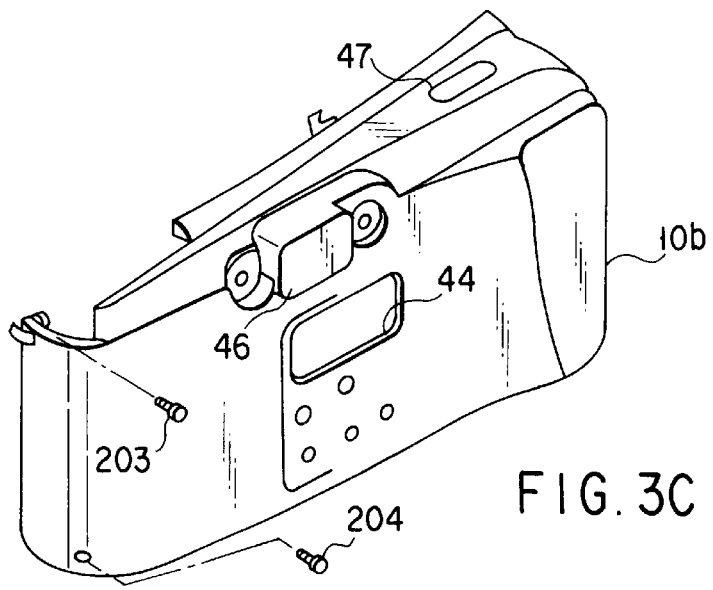
FIG. 3C is a perspective view showing a configuration of a rear cover unit.

As shown in FIG. 3B, in particular, the flexible printed boards extend so as to cover the outer periphery of the camera body 100. For example, first and second flexible printed boards 106 and 108 are connected to the AF unit 32 and the motor drive unit 38, respectively. For example, moreover, a third flexible printed board 110 is connected to a liquid crystal display unit 42, which can be attached to a liquid crystal display window 44 of the rear cover unit 10b. The display unit 42, which is fixed to a backup plate 112, can be attached to the display window 44 by screwing the plate 112 to the rear cover unit 10b.

As shown in FIGS. 1, 3A, 3B and 3C, the rear cover unit 10b is formed having a viewfinder eyepiece window 46, which is connected optically to a viewfinder objective window 116 of the front cover unit 10a by means of the AF unit 32 that is formed integrally with the camera body 100.

Further, the rear cover unit 10b is provided with a mode changing button 47, which is located corresponding to various mode changing switches (not shown) that are arranged on the flexible substrate unit 40.

Moreover, the rear cover unit 10b has a battery compartment gate lid 48, which allows a battery 50a to be loaded into and unloaded from a battery compartment 50 (see FIG. 4A) in the front cover unit 10a.

As shown in FIGS. 3A and 4A, furthermore, the rear cover unit 10b is provided with an electric circuit unit 118, which can be mounted thereon so as to adjoin the battery compartment 50. The unit 118 contains therein a charging circuit (not shown), which includes a capacitor 52 for activating the flashlight unit 15 on the front cover unit 10a, and the like.

The front cover unit 10a is furnished with a shutter button 54 that is located corresponding to a shutter switch (not shown) on the flexible substrate unit 40.

A specific configuration of the spool compartment will now be described with reference to FIGS. 2A and 2B.

In FIG. 2A, dashed lines indicate the way the lens barrel unit 16, film cartridge unit 22, and spool unit 24 are attached to the rail plate unit 20. More specifically, the attachment is achieved by individually engaging screws (not shown) in through holes 60 of the rail plate unit 20 with through holes 62 that are formed in the lens barrel support substrate 16a of the lens barrel unit 16, film cartridge unit 22, and spool unit 24. In this attachment operation, the lens barrel unit 16, film cartridge unit 22, and spool unit 24 can be positioned individually with respect to the rail plate unit 20 by combining a positioning hole or projection (not shown) in the unit 20 with positioning projections or holes (not shown) in the units 16, 22 and 24.

FIG. 2A shows a mask plate unit 64 for use as the area restricting window frame that is located in the area restricting window 20a of the rail plate unit 20. The unit 64 is positioned with respect to the window 20a in a manner such that positioning pins 66 formed on the front face of the unit 20 are fitted individually in positioning holes 64a in the unit 64. In this state, the mask plate unit 64 is held between the rail plate unit 20 and the combination of the lens barrel support substrate 16a and the lens barrel unit 16 with the ring-shaped light shielding member 18 between them.

In FIG. 2A, moreover, dashed lines indicate the way the lens barrel unit 16, film cartridge unit 22, and spool unit 24 are attached to the reinforcing plate unit 30. More specifically, the attachment is achieved by individually engaging screws (not shown) in through holes 68 of the plate unit 30 with through holes 70 that are formed in the lens barrel unit 16, film cartridge unit 22, and spool unit 24.

FIG. 2A shows a film cartridge gate aperture 38c, which is interposed between the film cartridge gate opening in the undersurface of the film cartridge unit 22 and the film cartridge gate lid (not shown in FIG. 2A) on the undersurface of the rear cover unit 10b. In this case, the aperture 38c constitutes part of the film cartridge compartment.

FIGS. 2A and 2B show the way the spool shaft 24a is rotatably held between the end walls 26 of the spool unit 24 and the way the motor 38a of the motor drive unit 38 is fitted in the center hole of the spool shaft 24a. The upper end wall 26 is formed having a rotation center port 26b that can hold the upper end portion of the spool shaft 24a for rotation. The lower end wall 26 is formed having an annular rotation center groove 26c that can support the lower end portion of the shaft 24a for rotation. Further, a center port 26d is formed in the center of the center groove 26c in the lower end wall 26. The motor 38a of the motor drive unit 38 can be introduced into the center hole of the spool shaft 24a through the port 26d.

A gear 24b is formed on the outer peripheral surface of the lower end portion of the spool shaft 24a. The gear 24b engages a power transmission gear (not shown) of the motor drive unit 38 through a notch (not shown) in the rotation center groove 26c of the lower end wall 26. This engagement allows turning force from the drive unit 38 to be transmitted to the spool shaft 24a.

The whole side wall of the spool compartment of the spool unit 24 that faces the film introduced therein except the portion 26a adjacent to the lens barrel unit 16, between the end walls 26 of the unit 24, is formed of the thin sheet 28 that is elastically deformable.

An annular notch 26e having a diameter larger than that of the annular rotation center groove 26c is formed in each of the whole respective opposite inner end faces of the end walls 26 except the portion 26a adjacent to the lens barrel unit 16.

The thin sheet 28, which is formed of a metal or light-shielding synthetic resin, includes a curved portion 28a, having a diameter smaller than that of the annular notch 26e in the inner end face of each end wall 26, and a flat portion 28b that extends along the portion 26a adjacent to the lens barrel unit 16.

The thin sheet 28 can be set between the end walls 26 in a manner such that its upper and lower end edges are elastically forced into their corresponding annular notches 26e, thereby elastically holding the notch 26e, and that the flat portion 28b is located extending along the portion 26a adjacent to the lens barrel unit 16.

Since the thin sheet 28 can be elastically set between the end walls 26 in this manner, its attachment to the end walls 26 is easy.

Since the end walls 26 are coupled to each other only by means of the portion 26a adjacent to the lens barrel unit 16, moreover, those portions of the walls 26 that are remote from the unit 16 can be elastically deformed to approach or recede from each other. Since the thin sheet 28 is elastic itself, furthermore, its attachment to the end walls 26 can be facilitated without improving the dimensional accuracy of the end walls 26 or the sheet 28.

According to the present embodiment, the whole side wall between the end walls 26 of the spool unit 24 except the portion 26a adjacent to the lens barrel unit 16 is formed of the thin sheet 28, so that the external dimensions of the other portions of the spool unit 24 than the portion 26a can be reduced. In consequence, the external dimensions of the front and rear cover units 10a and 10b can be reduced.

According to the present embodiment, moreover, the thin sheet 28 has the flat portion 28b, so that the thickness of the portion 26a of the spool unit 24 can be reduced. Accordingly, the reduction of the weight of the spool unit 24 can be further promoted, and the unit 24 can be brought closer to the lens barrel unit 16. Thus, the external dimensions of the camera can be further reduced.

In the case where the thin sheet 28 is formed of an elastic metal or elastic light-shielding synthetic resin having electrical conductivity, static electricity that is generated when the film touches the sheet 28 can be discharged from the sheet 28 through a grounded circuit of the flexible substrate unit 40 if the sheet 28 is connected to the grounded circuit, for example. In consequence, the static electricity can be prevented from accumulating in the thin sheet 28 to cause it to attract dust, which may possibly mar the film.

Thus, according to the present embodiment, the single camera body 100 (see FIG. 1) can be constructed by integrally combining a plurality of previously independently formed units, including the front and rear cover units 10a and 10b, flashlight unit 15, lens barrel unit 16, rail plate unit 20, film cartridge unit 22, spool unit 24, reinforcing plate unit 30, AF unit 32, pressure plate unit 34, motor drive unit 38, flexible substrate unit 40, and mask plate unit.

Even in forming a camera of a type different from the camera according to the present embodiment, therefore, the integral camera body 100 can be used as a common component, so that low-priced cameras of different types can be quickly put on the market by only preparing the other units (e.g., front and rear cover units 10a and 10b) than the common component.

Further, the camera according to the present embodiment is designed so that the camera body 100 can be incorporated in the camera sheath (front and rear cover units 10a and 10b) without causing the body 100 to be distorted, with use of the positioning means.

As shown in FIGS. 3A, 3B, 3C, 4A, 4B, 4C, 5A and 5B, the positioning means according to the present embodiment is composed of a pair of protrusions 120a and 120b protruding from the front cover unit 10a and a pair of hole portions 122a and 122b formed in the reinforcing plate unit 30 of the camera body 100 and capable of being fitted on the protrusions 120a and 120b, respectively.

The protrusions 120a and 120b are in the form of cylinders having the same outside diameter, while the hole portions 122a and 122b have different inside diameters. For example, the hole portion 122a in which the protrusion 120a is fitted is in the form of a circular hole having an inside diameter substantially equal to the outside diameter of the protrusion 120a, while the hole portion 122b in which the protrusion 120b is fitted is in the form of a slot having a minor-axis diameter substantially equal to the outside diameter of the protrusion 120b and a major-axis diameter longer than the outside diameter of the projection 120b.

In assembling the camera by utilizing the positioning means described above, the rear cover unit 10b is screwed to the front cover unit 10a after the protrusions 120a and 120b of the cover unit 10b are fitted individually into the hole portions 122a and 122b of the camera body 100. In screwing the cover units to each other, a pair of screws 201 and 202 are driven into the front cover unit 10a and fastened to the rear cover unit 10b through the battery compartment 50, and another pair of screws 203 and 204 are driven through the rear cover unit 10b and fastened to the front cover unit 10a.

In this state, a gap of about 1 mm or less is formed in the whole area between the camera body 100 and each of the front and rear cover units 10a and 10b except fitting portions including the positioning means. Thus, the camera body 100 can be positioned floating inside the front and rear cover units 10a and 10b.

Since the one hole portion 122b, out of the paired hole portions 122a and 122b, is a slot, moreover, it can absorb distortion, if any, of the front and rear cover units 10a and 10b.

In case the front and rear cover units 10a and 10b that are screwed to each other are partially distorted in some measure due to some malformation or dimensional errors, therefore, the slot-shaped hole portion 122b can absorb corrective force for distorted portions, distortional force that is generated in other portions by the correction of the distortion, etc. Since the camera body 100 is positioned floating with narrow gaps inside the front and rear cover units 10a and 10b, at the same time, the corrective force, distortional force in the other portions, etc. can never act directly on the camera body 100. Accordingly, the optic axis, the gap between the lens barrel and the film surface, etc. can be thoroughly prevented from being dislocated during the assembly of the camera. Moreover, neither electrical nor mechanical adjustment is required after the assembly. In consequence, the camera production efficiency can be improved.

Even if the camera body 100 is stored floating inside the front and rear cover units 10a and 10b, it can be kept in an integral state (e.g., a state such that the optic axis, the gap between the lens barrel unit 16 and the film surface, etc. are not dislocated). Although the camera body 100 is floating, therefore, it constitutes no hindrance to photographing.

As mentioned before, the camera body 100 has the flexible printed boards arranged on its outer peripheral surface. If the camera body 100 is positioned in the floating state by means of the positioning means during the assembly of the camera, therefore, the rear cover unit 10b presses the flexible printed boards (e.g., flexible printed board 110 connected to the liquid crystal display unit 42 that is fixed to the rear cover unit 10b) as it is fastened. When this is done, the camera body 100 is pressed against the front cover unit 10a by means of the force of pressure that acts on the printed boards. Actually, therefore, the camera body 100 can be held in a stable state between the front cover unit 10a and the printed boards.

In order to stabilize the position of the camera body 100 further, it is advisable, for example, to locate an elastic ring 124 (see FIGS. 2A, 2B, 4A, 4B, 4C, 5A and 5B) of an elastic material (e.g., rubber, resin, etc.) between the body 100 and the lens barrel pop-out opening 12 of the front cover unit 10a. According to the present embodiment, moreover, the elastic ring 124 is attached to the reinforcing plate unit 30 so as to cover the peripheral edge of the lens barrel opening 30a.

Figure 5A:
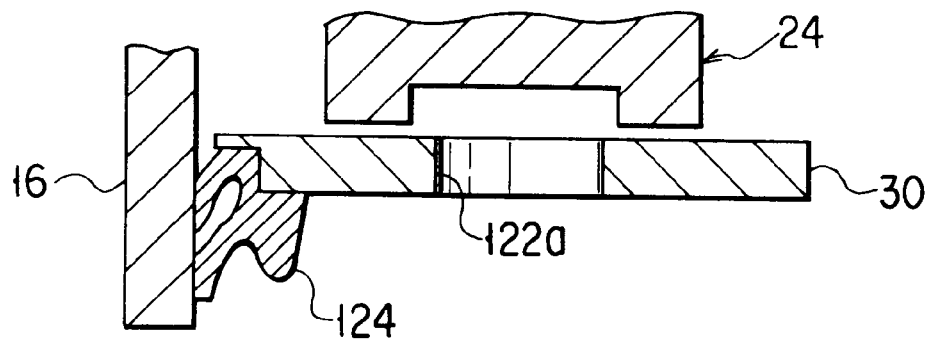
FIG. 5A is a partial sectional view showing a state of an elastic ring before the front cover unit is attached to the camera body.
Figure 5B:
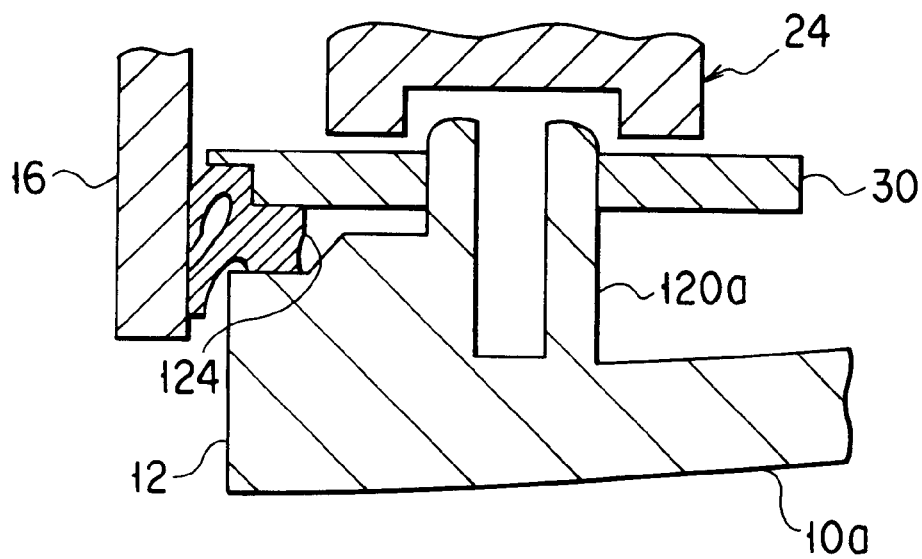
FIG. 5B is a partial sectional view showing a state of the elastic ring after the front cover unit is attached to the camera body.

If the rear cover unit 10b is screwed to the front cover unit 10a after the camera body 100 is positioned with respect to the front cover unit 10a by means of the positioning means with the elastic ring 124 set in this manner, the ring 124 is elastically deformed between the body 100 (reinforcing plate unit 30) and the front cover unit 10a, as shown in FIG. 5B, for example. This elastic deformation of the elastic ring 124 stabilizes the position of the camera body 100 inside the front and rear cover units 10a and 10b.

When assembling the camera is completed, moreover, the elastic ring 124 is located covering the respective peripheral edges of the lens barrel pop-out opening 12 and the lens barrel opening 30a, so that outdoor daylight can be prevented from getting into the camera body 100 through these openings.

A camera according to a second embodiment of the invention will now be described with reference to FIGS. 6A, 6B and 6C.

As shown in FIGS. 6A to 6C, the camera according to the present embodiment is designed so that the camera body 100 is urged forward (or toward the front cover unit 10a) by means of a rubber member 130 for use as urging means when it is incorporated in the camera sheath (front and rear cover units 10a and 10b). A description of other components is omitted, since they are constructed in the same manner as their respective counterparts according to the first embodiment.

According to this arrangement, the camera body 100 can be restrained from moving uselessly in the camera sheath, and the relative positions the camera body and various camera operating means in the camera sheath can be prevented from being dislocated substantially. A description of other effects is omitted, since they have already been described in connection with the first embodiment.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A camera comprising:

a camera sheath;

a camera body supported in the camera sheath such that space is provided between the camera body and an inner surface of the camera sheath; and positioning means composed of the camera sheath and the camera body, and having fitting means for positioning the camera body with respect to the camera sheath, the fitting means allowing the camera body to be movable to the camera sheath, wherein said positioning means comprises a pair of protrusions and a pair of hole portions capable of being fitted individually on the protrusions.

2. A camera comprising:

a camera sheath;

a camera body supported in the camera sheath such that space is provided between the camera body and an inner surface of the camera sheath; and positioning means composed of the camera sheath and the camera body, and having fitting means for positioning the camera body with respect to the camera sheath, the fitting means allowing the camera body to be movable to the camera sheath, wherein the camera body has at least a camera lens, a film cartridge compartment, and a film take-up compartment, and wherein said positioning means comprises a pair of protrusions and a pair of hole portions capable of being fitted individually on the protrusions.

3. A camera according to claim 2, wherein one of said hole portions is circular and the other of said hole portions is slot-shaped.

4. A camera comprising:

a camera sheath;

a camera body supported in the camera sheath such that space is provided between the camera body and an inner surface of the camera sheath; and positioning means composed of the camera sheath and the camera body, and having fitting means for positioning the camera body with respect to the camera sheath, the fitting means allowing the camera body to be movable to the camera sheath, wherein the camera body has at least a camera lens, a film cartridge compartment, and a film take-up compartment, and wherein said camera body includes a plate member fixedly fitted with the camera lens, film cartridge compartment, and film take-up compartment, the plate member having part of the positioning means.

5. A camera according to claim 4, wherein said plate member includes a pair of hole portions, and said camera sheath includes a pair of protrusions capable of being fitted individually in the hole portions.

6. A camera comprising:

a camera sheath;

a camera body supported in the camera sheath such that space is provided between the camera body and an inner surface of the camera sheath; and positioning means composed of the camera sheath and the camera body, and having fitting means for positioning the camera body with respect to the camera sheath, the fitting means allowing the camera body to be movable to the camera sheath, wherein said camera body has at least a camera lens, a film cartridge compartment, and a film take-up compartment, and includes a flexible electric substrate; and wherein said electric substrate extends from the camera body, the extending portion of the substrate having thereon a display device fixed to the camera sheath.

7. A camera comprising:

a camera sheath;

a camera body supported in the camera sheath such that space is provided between the camera body and an inner surface of the camera sheath; and positioning means composed of the camera sheath and the camera body, and having fitting means for positioning the camera body with respect to the camera sheath, the fitting means allowing the camera body to be movable to the camera sheath, wherein the positioning means has a first projection, a second projection, a circular hole into which the first projection is fitted, and a slot-shaped hole into which the second projection is fitted, and the first and second projections are movable with respect to the circular and slot-shaped holes, respectively, in a direction along which the first and second projections are fitted into or removed from the circular and slot-shaped holes, respectively.

* * * * *

UNITED STATES PATENT AND TRADEMARK OFFICE
CERTIFICATE OF CORRECTION

PATENT NO.      : 6,324,349 B2
DATED           : November 27, 2001
INVENTOR(S)     : Toshifumi Nakano et al.

It is certified that error appears in the above-identified patent and that said Letters Patent is hereby corrected as shown below:

<u>Title page,</u>
Item [75], Inventors, change "Sagamihari" to -- Sagamihara --.

Signed and Sealed this

Tenth Day of September, 2002

*Attest:*

*Attesting Officer*

JAMES E. ROGAN
*Director of the United States Patent and Trademark Office*